(12) United States Patent
Gabriel et al.

(10) Patent No.: US 12,085,193 B2
(45) Date of Patent: Sep. 10, 2024

(54) APPARATUS FOR NOISE REDUCTION IN VALVES

(71) Applicant: Fisher Controls International LLC, Marshalltown, IA (US)

(72) Inventors: Thomas N. Gabriel, Marshalltown, IA (US); Jonathan W. Richardson, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/903,448

(22) Filed: Sep. 6, 2022

(65) Prior Publication Data

US 2024/0077148 A1 Mar. 7, 2024

(51) Int. Cl.
  *F16K 47/08* (2006.01)
  *F16K 47/14* (2006.01)

(52) U.S. Cl.
  CPC .............. *F16K 47/08* (2013.01); *F16K 47/14* (2013.01)

(58) Field of Classification Search
  CPC .................................. F16K 47/08; F16K 47/14
  See application file for complete search history.

(56) References Cited

U.S. PATENT DOCUMENTS

| | | | | |
|---|---|---|---|---|
| 3,693,659 A * | 9/1972 | Parola | ................ | G05D 16/0658 137/625.3 |
| 3,722,854 A * | 3/1973 | Parola | .................... | F16K 47/08 137/625.3 |
| 3,954,124 A * | 5/1976 | Self | ........................... | F16K 3/34 138/40 |
| 4,108,210 A * | 8/1978 | Luthe | ...................... | F16K 47/08 138/40 |
| 4,429,714 A * | 2/1984 | Hughes | .................. | F16K 47/08 138/41 |
| 4,479,509 A * | 10/1984 | Dear | ....................... | F16K 47/02 138/140 |
| 4,617,963 A * | 10/1986 | Stares | ..................... | F16K 47/08 181/267 |
| 5,020,571 A * | 6/1991 | Tartaglia | ................. | F16K 47/08 137/625.37 |
| 6,637,452 B1 * | 10/2003 | Alman | .................... | F16K 3/243 251/324 |
| 6,766,826 B2 * | 7/2004 | Baumann | ................ | F16K 47/08 137/625.3 |
| 8,950,431 B2 * | 2/2015 | Kim | ........................ | F16K 47/08 137/625.33 |
| 10,359,128 B2 * | 7/2019 | Griffin, Jr. | ............. | F16K 47/08 |
| 10,487,961 B2 | 11/2019 | Eilers et al. | | |
| 11,156,241 B2 | 10/2021 | Eilers et al. | | |

(Continued)

*Primary Examiner* — Matthew W Jellett
*Assistant Examiner* — Christopher D Ballman
(74) *Attorney, Agent, or Firm* — HANLEY, FLIGHT & ZIMMERMAN, LLC (57) ABSTRACT

Apparatus for noise reduction in valves are disclosed herein. An example valve disclosed herein includes a valve body defining a fluid passageway between an inlet and an outlet, a plug, and a cage in the fluid passageway. The plug is disposed in the cage. The plug is moveable in the cage to control fluid flow through the fluid passageway. The cage includes an inner wall having first openings, an outer wall having second openings, the outer wall disposed coaxially around the inner wall, and an insert having third openings. The insert is disposed between the inner wall and the outer wall.

19 Claims, 8 Drawing Sheets

(56) References Cited

U.S. PATENT DOCUMENTS

| | | | |
|---|---|---|---|
| 11,353,139 B1* | 6/2022 | Mann, III | F16K 47/14 |
| 11,353,277 B2* | 6/2022 | Muceus | F41A 21/32 |
| 2006/0049375 A1* | 3/2006 | Gossett | F16K 25/005 |
| | | | 251/357 |
| 2013/0320252 A1* | 12/2013 | Hageman | F16K 3/246 |
| | | | 251/324 |
| 2014/0014493 A1* | 1/2014 | Ryan | B01D 61/364 |
| | | | 203/49 |
| 2021/0095786 A1* | 4/2021 | Barron | F16K 47/08 |
| 2022/0325823 A1 | 10/2022 | Eilers et al. | |

* cited by examiner

APPARATUS FOR NOISE REDUCTION IN VALVES

FIELD OF THE DISCLOSURE

This disclosure relates generally to valves and, more particularly, to apparatus for noise reduction in valves.

BACKGROUND

Valves are commonly used in process control systems to control the flow of process fluids (e.g., water, gas, etc.). Sliding stem valves (e.g., a gate valve, a globe valve, a diaphragm valve, a pinch valve, etc.) typically have a closure member (e.g., a valve plug) disposed in a fluid passageway of the valve. A valve stem operatively couples the closure member to an actuator to move the closure member between an open position and a closed position to allow or restrict fluid flow between an inlet and an outlet of the valve. Additionally, to provide desired and/or to achieve certain flow characteristics of the fluid, valves often employ a cage interposed in the fluid passageway. The closure member is disposed in and moveable in the cage. The cage may be used to reduce capacity flow, attenuate noise and/or reduce or eliminate cavitation.

SUMMARY

Disclosed herein is an example valve including a valve body defining a fluid passageway between an inlet and an outlet, a plug, and a cage in the fluid passageway. The plug is disposed in the cage. The plug is moveable in the cage to control fluid flow through the fluid passageway. The cage includes an inner wall having first openings, an outer wall having second openings, the outer wall disposed coaxially around the inner wall, and an insert having third openings. The insert is disposed between the inner wall and the outer wall.

Disclosed herein is an example cage to be disposed in a fluid passageway of a valve. The cage includes an inner wall having first openings and an outer wall having second openings. The outer wall is disposed coaxially around the inner wall such that a cavity is formed between the inner wall and the outer wall. The cage also includes a removeable insert between the inner wall and the outer wall. The insert is coaxial with the inner wall and the outer wall. The insert has a lattice structure forming third openings through the insert.

Disclosed herein is an example method including inserting an insert into a cavity defined between an inner wall and an outer wall of a cage. The inner wall, the outer wall, and the insert are coaxial. The insert includes a lattice structure defining openings through the insert. The method also includes installing the cage in a valve body of a valve.

BRIEF DESCRIPTION OF THE DRAWINGS

In general, the same reference numbers will be used throughout the drawing(s) and accompanying written description to refer to the same or like parts. The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Many known process control and/or fluid distribution systems (e.g., power generation systems, petroleum refinery systems, etc.) employ process control devices to affect the flow of fluid. For example, valves are a common type of process control device that are used to control the flow of fluid (e.g., liquids, gases, etc.) between an upstream source and a downstream location. Some known valves, such as sliding-stem valves (e.g., globe valves) include a plug that is moveable relative to a seat between an open position and a closed position. When the plug is in the opened position, the plug is disengaged from the seat and allows fluid to flow from an inlet of the valve to an outlet of the valve. When the plug is in the closed position, the plug is engaged with the seat and prevents fluid flow between the inlet and the outlet. Opening and closing of the valve can be performed manually or via a command signal that controls an actuator to move the plug.

When the valve is in the open position, the restriction of the flow through the valve increases the velocity of the fluid but decreases the pressure of the fluid. If the pressure falls below the vapor pressure of the fluid, vapor bubbles are formed. When the pressure recovers downstream, these vapor bubbles implode, causing high pressure waves. This phenomenon, referred to as "cavitation," can cause significant damage to the valve and downstream piping in the form of erosion. Damage to the valve due to cavitation can cause the valve to lose its sealing capacity. Furthermore, cavitation can result in other adverse effects such as loud noise and strong vibrations.

Noise can also be generated from the use of valves and other control valves due to turbulent flow. As the fluid flows through the restriction of an open valve, its velocity increases while its pressure decreases. As high-velocity fluid exits the valve, the high-velocity fluid interacts with relatively stationary or low velocity fluid at the outlet of the valve. The interaction of fluids occurs at a shear layer between the high-velocity fluid and the stationary or low velocity fluid. In such cases, noise is caused by an increase in turbulence at the shear layer.

In some examples, valves are equipped with a trim assembly including a cage to control the noise and cavitation of the fluid flowing through the valve. The cage is disposed in the fluid passageway. The plug is disposed in and moveable (e.g., slidable) in the cage. The cage includes openings (e.g., holes, slots, etc.) through which the fluid travels when the plug is in the open position. In some examples, the cage has a single wall with openings. In other examples, the cage may have two walls, such as an inner wall and an outer wall, both with openings. One way in which a cage may control cavitation is pressure staging. During pressure staging, the pressure drop across the valve is split using a multi-stage trim such as a cage with an inner wall and an outer wall. Pressure staging keeps the pressure from falling to near the vapor pressure of the fluid, thereby helping to prevent vapor bubbles from forming. Furthermore, the cage may be used to reduce or isolate the damage from cavitation. Openings in the cage through which the fluid travels result in jet separation of the fluid traveling through the valve. Cavitation is isolated by directing fluid into the center of the valve using a flow down orientation so that bubbles implode away from the valve components, thus minimizing damage to valve components.

In some examples, to achieve desirable noise abatement, the openings in the inner wall of the cage are relatively small, such as 1/16" (inch) in diameter. Smaller diameter openings create noise composed of higher acoustic frequencies than larger diameter openings. Human hearing is in the range of 20-20,000 hertz (Hz). Therefore, using smaller diameter openings tends to shift the noise frequency to frequencies that are less audible or not audible at all to the human ear. However, these small openings are prone to plugging or clogging with use of the valve when particulate or debris in the fluid (e.g., weld slag, rust, scale, etc.) becomes trapped in the openings. When some portion of the openings become plugged, the cage underperforms regarding capacity of fluid that can flow through the valve. Additionally, if particulate or debris becomes trapped in the openings on the inner wall of the cage, plug travel may be impeded as the plug interfaces with the trapped debris. This can also result in lack of proper valve shut-off.

One known solution to prevent plugging of cage openings is to use larger openings in the cage wall (e.g. 1/4" diameter). While these large openings are less likely to plug, the effectiveness of the openings to reduce cavitation and valve noise and vibration is decreased. As such, this is not an ideal solution. Another known solution to plugged cage openings is to remove and clean the valve cage. The cleaning operation may include drilling out the individual openings to their nominal size and can be very time consuming. Additionally, some valve users who clean their valve cages increase the size of the openings from their nominal size to prevent the need for future cleanings, thus reducing the anti-cavitation and noise attenuation properties of the cage.

Disclosed herein are example cages for valves (e.g., globe valves, ball valves, etc.) that include a removeable insert between an inner wall and an outer wall of the cage. In some examples, the insert has a lattice structure, such as a triply periodic lattice structure. The lattice structure forms or defines openings through the insert. The openings in the insert may be smaller than the openings in the inner wall and the outer wall. For example, the openings in the insert can be 1/16" or smaller, while the openings in the inner and outer walls can be 1/4". The openings can be sized based on the application needs to achieve the desired noise attenuation, cavitation reduction, flow capacity, and other parameters. Therefore, the openings in the inner and outer walls can be formed larger, which reduces or eliminates clogging or galling the openings of the inner and outer walls. Instead, any particulate or debris may become trapped in the insert. However, the insert is easily removable and cleanable. For example, the insert can be removed, washed (e.g., with a pressure washer), and then replaced. Therefore, the whole cage does not need to be removed from the valve and cleaned. In other examples, the insert can be removed from the cage and replaced with a new insert. Therefore, only the insert, which is a relatively small, less expensive component, is replaced. Further, because the particulate and debris is trapped in the insert rather than the inner wall, this clogging does not interfere with movement of the plug along the inner wall.

In some examples disclosed herein, the insert is constructed via an additive manufacturing process, sometimes referred to as three-dimensional (3D) printing. As used herein, additive manufacturing or 3D printing refers to a manufacturing process that builds a 3D object by adding successive adjacent layers of material. The layers fuse together (e.g., naturally or via a subsequent fusing process) to form the 3D object. The material may be any material, such as plastic, metal, concrete, etc. Examples of additive manufacturing include Stereolithography (SLA), Selective Laser Sintering (SLS), fused deposition modeling (FDM), and multi jet modeling (MJM). 3D printing is advantageous because it results in less wasted material than known machining operations. Therefore, 3D printing the inserts results in a relatively lower cost cage. Further, 3D printing is advantageous because it can be used to form high density features, such as the lattice structure that forms the small openings (flow paths), which may not be feasible with known machining processes.

Figure 1:
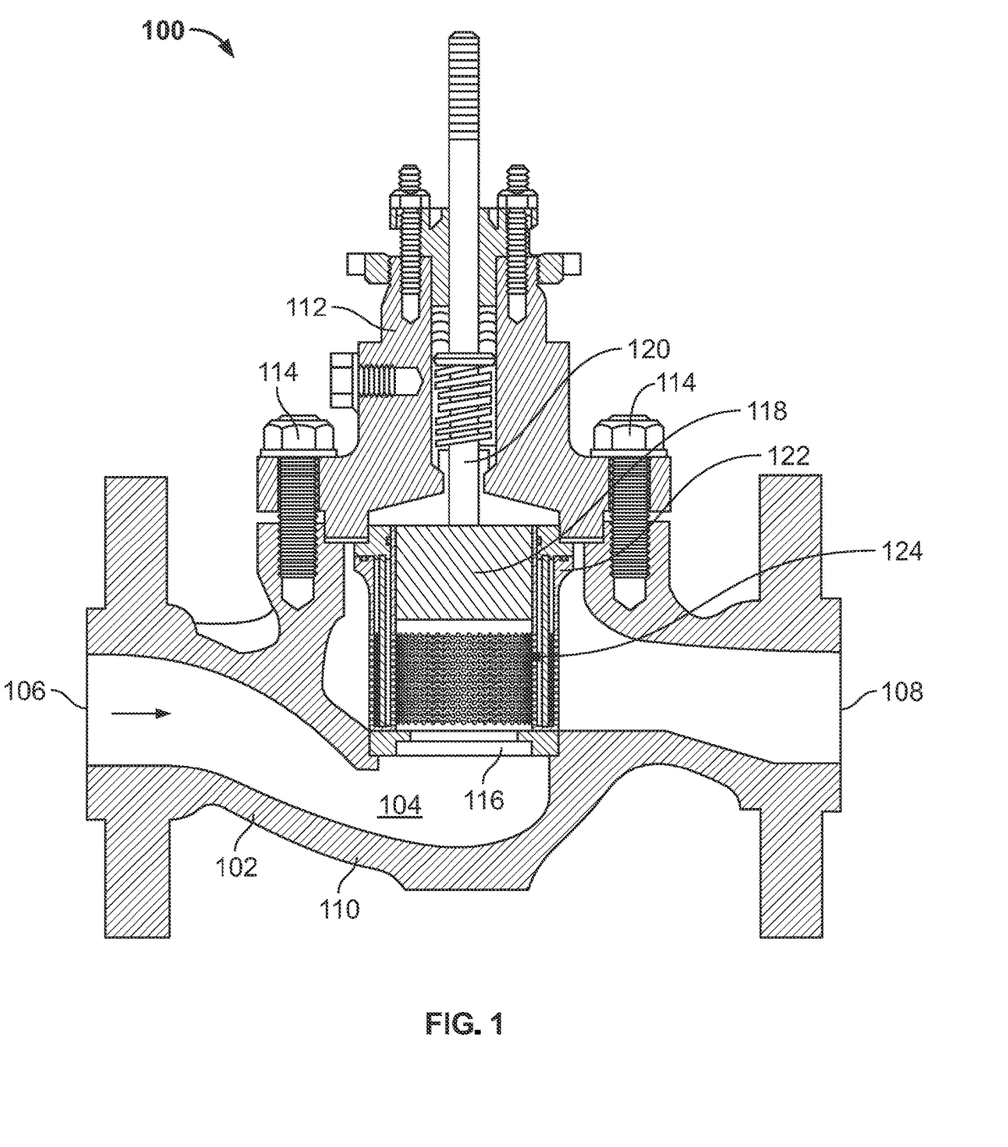
FIG. 1 is a cross-sectional view of an example valve having an example cage.

FIG. 1 is a cross-sectional view of an example valve 100 constructed in accordance with the teachings of this disclosure. The valve 100 can be used to control the flow of a fluid, such as water or gas. The valve 100 is a type of sliding stem valve, such as a globe valve. In other examples, the valve 100 can be implemented as another type of valve.

In the illustrated example, the valve 100 includes a valve body 102 defining a fluid passageway 104 between an inlet 106 and an outlet 108. The valve body 102 can be coupled between two pipes and used to control the flow of fluid between an upstream source and a downstream area. In some examples, the valve body 102 include multiple body portions that are coupled together. For example, in FIG. 1, the valve body 102 has a first body portion 110 and a second body portion 112 (sometimes referred to as a bonnet) coupled to the first body portion 110. In the illustrated example, the second body portion 112 is coupled to the first body portion 110 via one or more threaded fasteners 114 (e.g., bolts).

In the illustrated example, the valve 100 includes an example seat 116 disposed in the fluid passageway 104. The valve 100 also includes an example valve plug 118. In some examples, the plug 118 is a balanced plug. The valve 100 includes an example stem 120 that extends through the second body portion 112 and is coupled to the plug 118 in the fluid passageway 104. The stem 120 can be coupled to an actuator (e.g., a pneumatic actuator, etc.) or a hand-operated device (e.g., a handwheel). In operation, the actuator moves the stem 120 up and down to move the valve plug 118 between an open position and a closed position. In the open position, which is the position shown in FIG. 1, the plug 118 is spaced from the seat 116, which allows fluid flow through the fluid passageway 104 between the inlet 106 and the outlet 108. In the closed position, the plug 118 is sealingly engaged with the seat 116, which prevents fluid flow through the seat 116 and, thus, through the fluid passageway 104 between the inlet 106 and the outlet 108.

In the illustrated example, the valve 100 includes an example cage 122 disposed in the fluid passageway 104. In this example, the cage 122 is cylindrical or sleeve-shaped. The cage 122 defines a central bore or channel 124. The plug 118 is disposed in the channel 124 of the cage 122. The plug 118 is moveable (e.g., slidable) up and down in the channel 124 of the cage 122 to control fluid flow through the fluid passageway 104. The wall of the cage 122 has a plurality of openings, shown in further detail herein. When the plug 118 is in the open position, fluid flows through the seat 116, into the channel 124, and through the openings in the wall of the cage 122 to the outlet 108. The size, shape, and/or layout of the openings can be designed to reduce noise and cavitation. When the plug 118 is in the closed position, the plug 118 engages the seat 116, which blocks the flow of fluid into the channel 124 of the cage 122.

In the illustrated example, the cage 122 is coupled to the valve body 102. In some examples, the cage 122 is clamped between two portions of the valve body 102. For example, to install the cage 122, the second body portion 112 is detached from the first body portion 110, the cage 122 is inserted into the fluid passageway 104, and then second body portion 112 is re-attached to the first body portion 110, which clamps the cage 122 between the first and second body portions 110, 112. In other examples, the cage 122 can be coupled to the valve body 102 in other manners.

Figure 2:
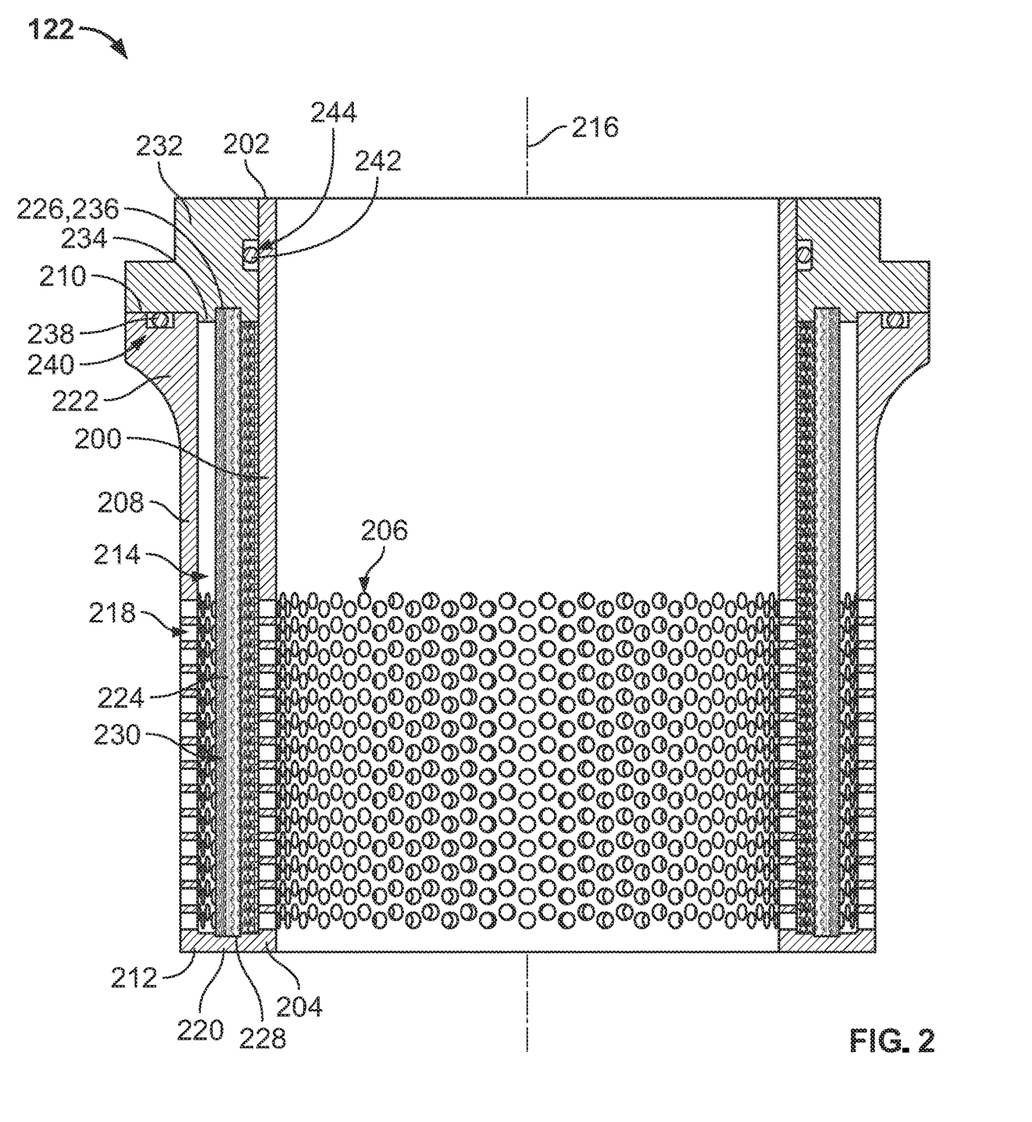
FIG. 2 is an enlarged cross-sectional view of the example cage of FIG. 1 including an example insert that can be implemented in the example cage.

FIG. 2 is an enlarged cross-sectional view of the example cage 122 of FIG. 1. In the illustrated example, the cage 122 includes a first wall, 200, referred to herein as an inner wall 200, having a first end 202 and a second end 204 opposite the first end 202. The inner wall 200 has first openings 206 (one of which is referenced in FIG. 2) that extend transversely through the inner wall 200. The first openings 206 can also be referred to as inlet openings. In this example, the first openings 206 are circular-shaped. However, in other examples, the first openings 206 can be shaped differently. For instance, in other examples, the first openings 206 can be shaped as elongated slots. In some examples, the first openings 206 are spaced equidistant from each other.

In the illustrated example, the cage 122 also includes a second wall 208, referred to herein as an outer wall 208, having a first end 210 and a second end 212 opposite the first end 210. The inner wall 200 and the outer wall 208 are cylindrical or sleeve-shaped. As shown in FIG. 2, the outer wall 208 is disposed coaxially around the inner wall 200. In particular, the inner wall 200 and the outer wall 208 are aligned along a central axis 216 of the cage 122. The outer wall 208 has a larger diameter than the inner wall 200. As such, a cavity 214 (e.g., a gap, a space) is formed between the inner wall 200 and the outer wall 208.

In the illustrated example, the outer wall 208 has second openings 218 (one of which is referenced in FIG. 2) that extend transversely through the outer wall 208. The second openings 218 can also be referred to as outlet openings. In this example, the second openings 218 are circular-shaped. However, in other examples, the second openings 218 can be shaped differently. In some examples, the second openings 218 are spaced equidistant from each other. In some examples, the first openings 206 of the inner wall 200 and the second openings 218 of the outer wall 208 are the same shape and/or size. For example, the first and second openings 206, 218 may be ¼" circular-holes. In other examples, the first and second openings 206, 218 can be different shapes and/or sizes. In operation, the fluid flows through the first openings 206 in the inner wall 200, through the cavity 214, and through the second openings 218 of the outer wall 208 to the outlet 108 (FIG. 1). In some examples, at least a portion of the first openings 206 in the inner wall 200 are radially aligned with at least a portion of the second openings 218 in the outer wall 208. For example, during manufacturing, the inner and outer walls 200, 208 can be aligned, and then holes can be drilled through both the inner and outer walls 200, 208 simultaneously to form the first and second openings 206, 218. However, in other examples, the first openings 206 may be offset from the second openings 218.

In the illustrated example, the cage 122 includes an end wall 220 coupled between the second end 204 of the inner wall 200 and the second end 212 of the outer wall 208. The inner wall 200, the outer wall 208, and the end wall 220 form a body 222 of the cage 122. In some examples, the body 222 (including the inner wall 200, the outer wall 208, and the end wall 220) is constructed as a single unitary part or component (e.g., a monolithic structure). However, in other examples, the inner wall 200, the outer wall 208, and the end wall 220 can be constructed as three separate components that are coupled together (e.g., via welding, fasteners, etc.).

In the illustrated example, the cage 122 includes an example insert 224 that is removably disposed between the inner wall 200 and the outer wall 208. In particular, the insert 224 is disposed in the cavity 214 defined between the inner wall 200, the outer wall 208, and the end wall 220. The insert 224 is cylindrical or sleeve-shaped. The insert 224 has a first end 226 and a second end 228 opposite the first end 226. In the illustrated example, the insert 224 has third openings 230 (one of which is referenced in FIG. 2), which form fluid flow paths through the insert 224. The insert 224 is disposed coaxially with the inner wall 200 and the outer wall 208. In the illustrated example of FIG. 2, the insert 224 is spaced apart from the inner wall 200 and the outer wall 208. In some examples, the insert 224 is spaced equidistant from the inner wall 200 and the outer wall 208. In other examples, the insert 224 may be closer to one wall 200, 208 than the other wall 200, 208. In some examples, the insert 224 may be sized such that the insert 224 is in contact with the inner wall 200 and/or the outer wall 208.

In the illustrated example, the cage 122 includes a retainer 232. The retainer 232 can be used to hold the insert 224 in the cavity 214 between the inner wall 200 and the outer wall 208. In the illustrated example, the retainer 232 is coupled to the inner and outer walls 200, 208 opposite the end wall 220. In particular, the retainer 232 is coupled to the inner and outer walls 200, 208 at or near the first ends 202, 210. In some examples, the insert 224 is clamped between the retainer 232 and the end wall 220. For example, the retainer 232 has a flange 234 that extends into the cavity 214. In some examples, the flange 234 is friction fit between the inner wall 200 and the outer wall 208. The first end 226 of the insert 224 is engaged with the flange 234, and the second end 228 of the insert 224 is engaged with the end wall 220, thereby constraining the insert 224 in the cavity 214. In some examples, the flange 234 has a notch or recess 236. The first end 226 of the insert 224 is disposed in the recess 236, which prevents or limits the insert 224 from moving in the cavity 214. In some examples, the end wall 220 includes a similar notch or recess for holding the second end 228 of the insert 224. The cage 122 may have one or more seals. For example, the cage 122 has a first seal 238 (e.g., an o-ring) disposed in a seal gland 240 formed in the first end 210 of the outer wall 208 to seal between the outer wall 208 and the retainer 232. The cage 122 also includes a second seal 242 (e.g., an o-ring) disposed in a seal gland 244 formed in the retainer 232 to seal between the inner wall 200 and the retainer 232.

During operation, when the plug 118 (FIG. 1) is in the open position, fluid flows through the first openings 206 in the inner wall 200 and into the cavity 214, through the third openings 230 in the insert 224, and through the second openings 218 in the outer wall 208. In some examples, the third openings 230 are smaller (e.g., have a smaller diameter) than the first openings 206 of the inner wall 200 and the second openings 218 of the outer wall 208. These small openings reduce noise and cavitation. The insert 224 can be constructed to have any size openings 230 to achieve the desired levels of noise attenuation and cavitation reduction. In other examples, the third openings 230 can be the same as or larger than the first and/or second openings 206, 218. As shown in FIG. 2, only the bottom portions of the inner and outer walls 200, 208 have openings, because the plug 118 (FIG. 1) typically blocks the upper portions of the cage 122 in the open position. However, as shown in FIG. 2, the insert 224 can utilize the full wall area of the cage 122, which can improve flow capacity through the cage 122.

Figure 3A:
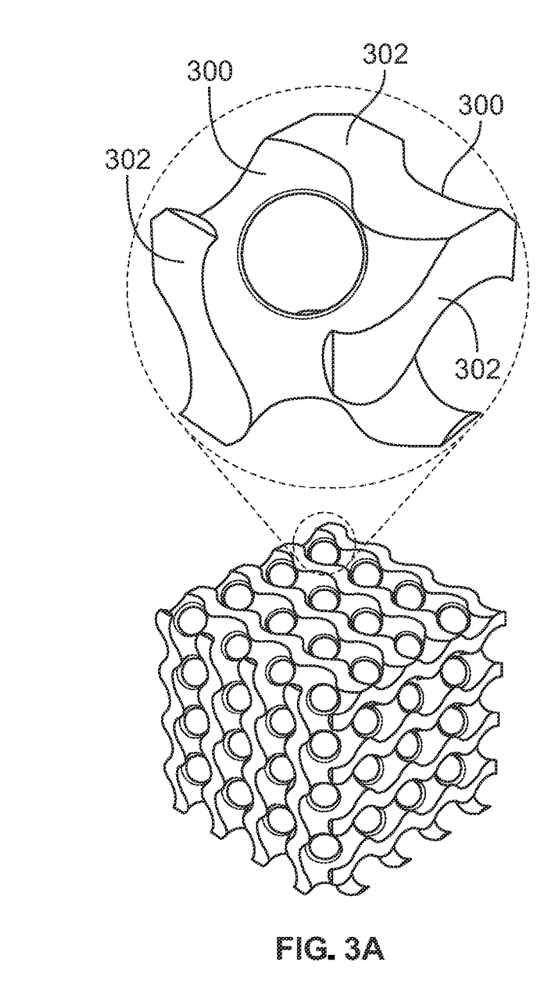
FIGS. 3A, 3B, and 3C illustrate example lattice structures that can be used as the example insert of FIG. 2.
Figure 3B:
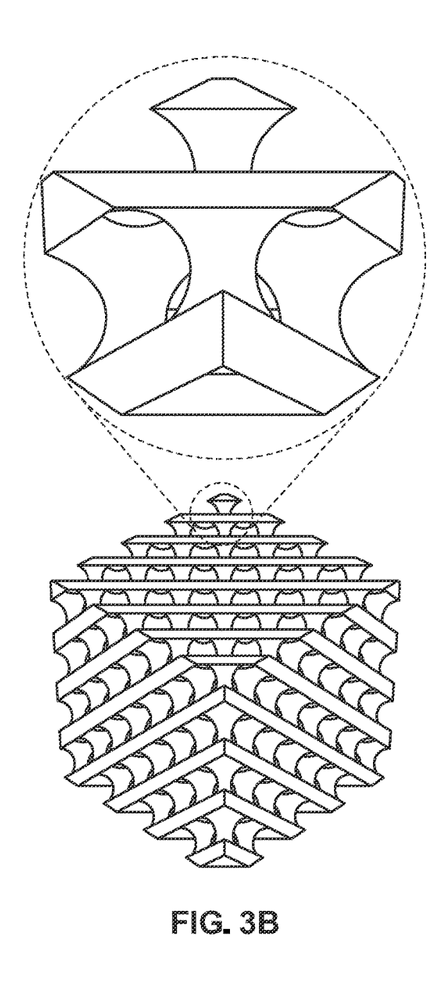
Figure 3C:
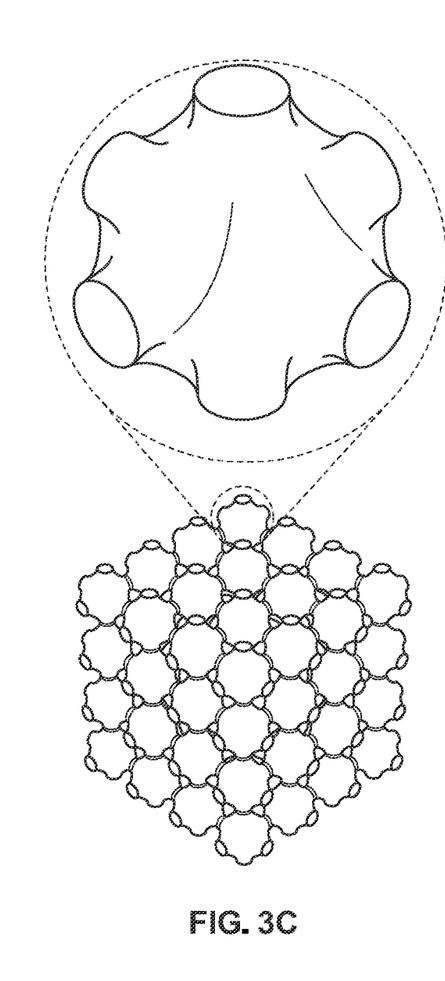

In the illustrated example, the insert 224 has a lattice structure, which forms the third openings 230 through the insert 224. In some examples, the lattice structure is a triply periodic lattice structure (sometimes referred to as triply periodic minimal surface (TPMS) lattice structure). The triply periodic lattice structure has small, interconnected cells or voids that form the openings 230 and thereby define fluid passageways through the insert 224. FIGS. 3A, 3B, and 3C illustrate three examples of triply periodic lattice structures that can be implemented as the lattice structure of the insert 224. FIG. 3A shows an example lattice structure having gyroid-shaped cells, FIG. 3B shows an example lattice having diamond-shaped cells, and FIG. 3C shows an example lattice having primitive-shaped cells. The cell size and volume fraction of the lattice structure can be configured based on the desired flow characteristics. In some examples, the lattice can be graded, such that at low flow speeds, the lattice can have a lower volume fraction, and at higher flow speeds, the lattice can have higher volume fraction.

As disclosed above, in some examples, the insert 224 is constructed via additive manufacturing (e.g., 3D printer). For example, the insert 224 may be constructed by a 3D printer. Therefore, in some examples, the insert 224 is constructed of multiple layers of a same material (e.g., metal) bonded or fused together. The insert 224 can be constructed of any material capable of being printed by a 3D printer. In some examples, the insert 224 is constructed of carbon steel, 316 stainless steel, cobalt chrome, aluminum, and/or titanium. In other examples, the insert 224 can be constructed of other materials. In some examples, additives or other components are added to make a raw material printable via 3D printing. In some examples, 3D printing can be used to construct the insert 224 from multiple layers of different materials that are weld compatible. For example, the outer or exterior surfaces of the lattice structure can be constructed of harder material that is wear resistant and improves lifespan, such as a cobalt-chromium-tungsten alloy (Alloy-6), while the inner core of the lattice structure can be constructed of a strong but less expensive material, such as 300 series stainless steel. For example, referring to FIG. 3A, an outer or exterior surface 300 of the lattice structure is constructed of the harder material for withstanding wear, while an inner core 302 of the lattice structure is constructed of a strong but less expensive material. 3D printing is advantageous because it can be used to form small, high density features, such as the triply periodic lattice structure. As such, the openings 230 can be sized smaller than openings formed with known machining techniques. In other examples, the lattice structure of the insert 224 can be another type of lattice structure and/or constructed via other types of manufacturing. In some examples, the insert 224 is constructed (e.g., printed) as a single unitary part or component. In other examples the insert 224 can be constructed as multiple parts or sections that are coupled together. In some examples, the insert 224 is constructed via 3D printing, while the body 222 of the cage 122 is constructed via traditional machining techniques (e.g., drilling, cutting, stamping, etc.). In other examples, the body 222 of the cage 122 can also be constructed via 3D printing.

As disclosed above, in some examples, the third openings 230 are smaller than the openings 206, 218 in the inner and outer walls 200, 208. As such, particulate and debris in the fluid may become trapped in the third openings 230 of the insert 224. In some examples, after a period of time, the insert 224 can be removed from the cavity 214, cleaned, and replaced back into the cavity 214 of the cage 122. In some examples, the insert 224 can be sprayed (e.g., power-washed) with water or another fluid to release the clogged debris. As shown in FIG. 2, only the bottom portions of the inner and outer walls 200, 208 have openings for fluid flow. As such, only the bottom portion of the insert 224 may be clogged, but the top portion may be clean. In such an example, the insert 224 can be turned upside down and replaced in the cavity 214 so the clean portion is at the bottom. In other examples, the insert 224 can be removed from the cavity 214 and replaced with another insert (e.g., a new insert). Cleaning and/or replacing the insert 224 is easier, quicker, and less expensive than repairing the clogged openings of known cage designs. Further, because the insert 224 has small openings 230 to achieve the desired noise attenuation and cavitation reduction, the openings 206, 218 in the inner and outer walls 200, 208 can be made larger, which is easier and less expensive for manufacturing. In some examples, one type of body 222 can be manufactured, and different types of inserts can be manufactured and used to customize the cage 122 based on the desired flow characteristics. This reduces manufacturing time and costs since only one type of cage body needs to be manufactured.

Figure 4:
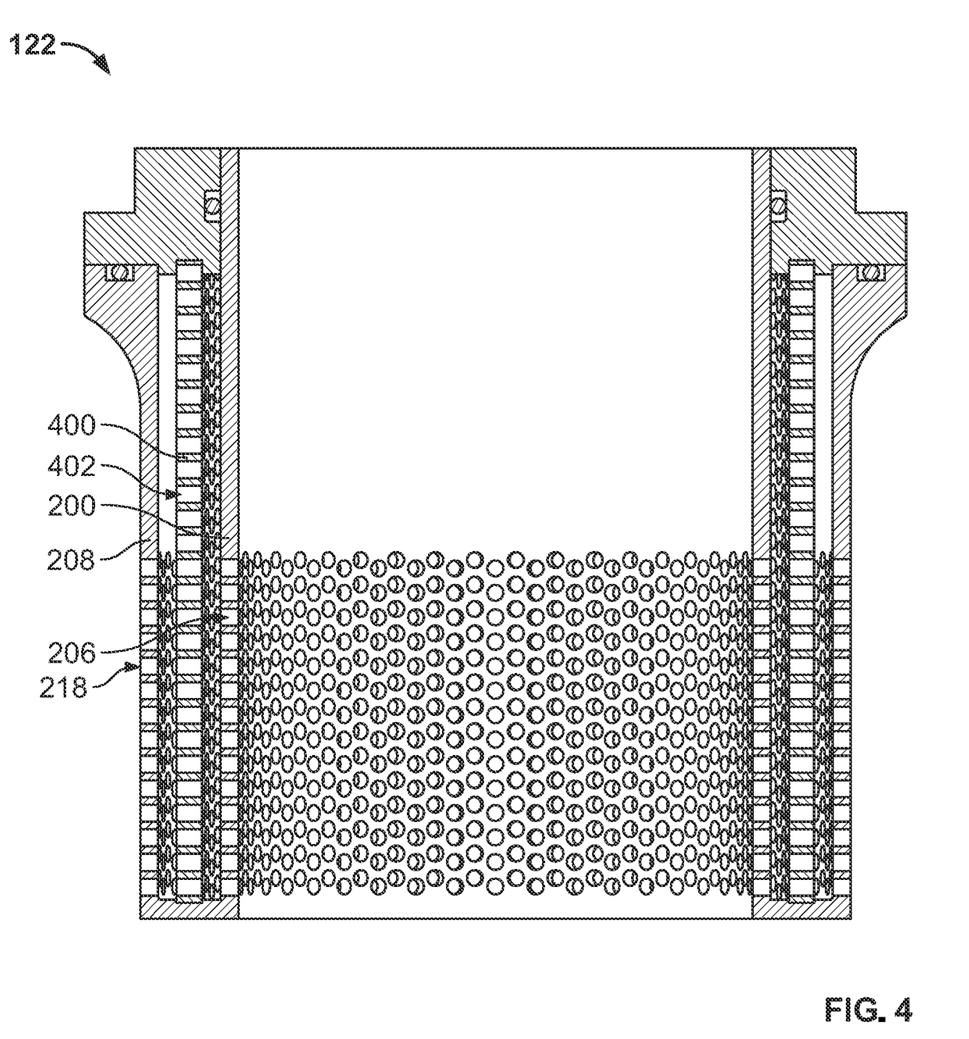
FIG. 4 is a cross-sectional view of the example cage of FIG. 2 showing another example insert that can be implemented in the example cage.

In other examples, instead of a lattice structure, the insert 224 may have straight through-holes. For example, FIG. 4 shows an example of the cage 122 including an example insert 400. In this example the insert 400 has a plurality of openings 402 (one of which is referenced in FIG. 4) that are through-holes extending transversely through the insert 400. In some examples, the insert 400 is a machine component. For example, the insert 400 may be a metal sleeve or cylinder with holes that have been drilled through the insert 400. In other examples, the insert 400 can be constructed from other types of manufacturing, such as 3D printing. In some examples the openings 402 are smaller than the openings 206, 218 in the inner and outer walls 200, 208.

Figure 5:
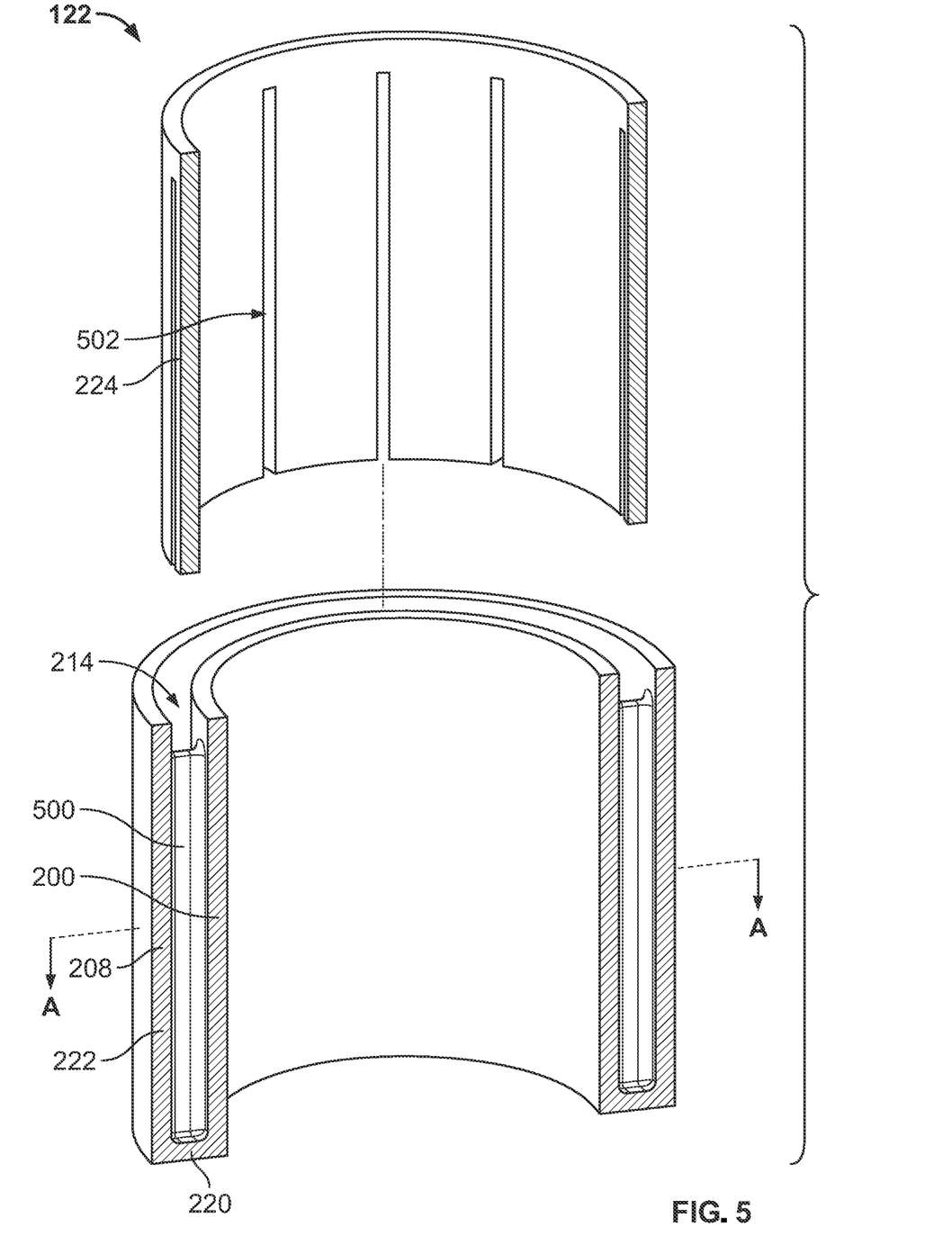
FIG. 5 is an exploded cross-sectional view of the example cage of FIG. 2 showing example ribs that can be implemented in the example cage.

In some examples, the cage 122 can include one or more features to prevent or limit the insert 224 from rotating. FIG. 5 is an exploded cross-sectional view of the cage 122. The insert 224 and the inner and outer walls 200, 208 are shown as solid, but would have openings as disclosed herein. In this example, the body 222 of the cage 122 includes ribs 500 (one of which is referenced in FIG. 5) extending between the inner wall 200 and the outer wall 208. In the illustrated example, the ribs 500 extend down to the end wall 220. The insert 224 has slots 502 (one of which is referenced in FIG. 5) that correspond to the ribs 500. When the insert 224 is inserted into the cavity 214, the ribs 500 extend through the slots 502. The ribs 500 prevent or limit the insert 224 from rotating in the body 222.

Figure 6:
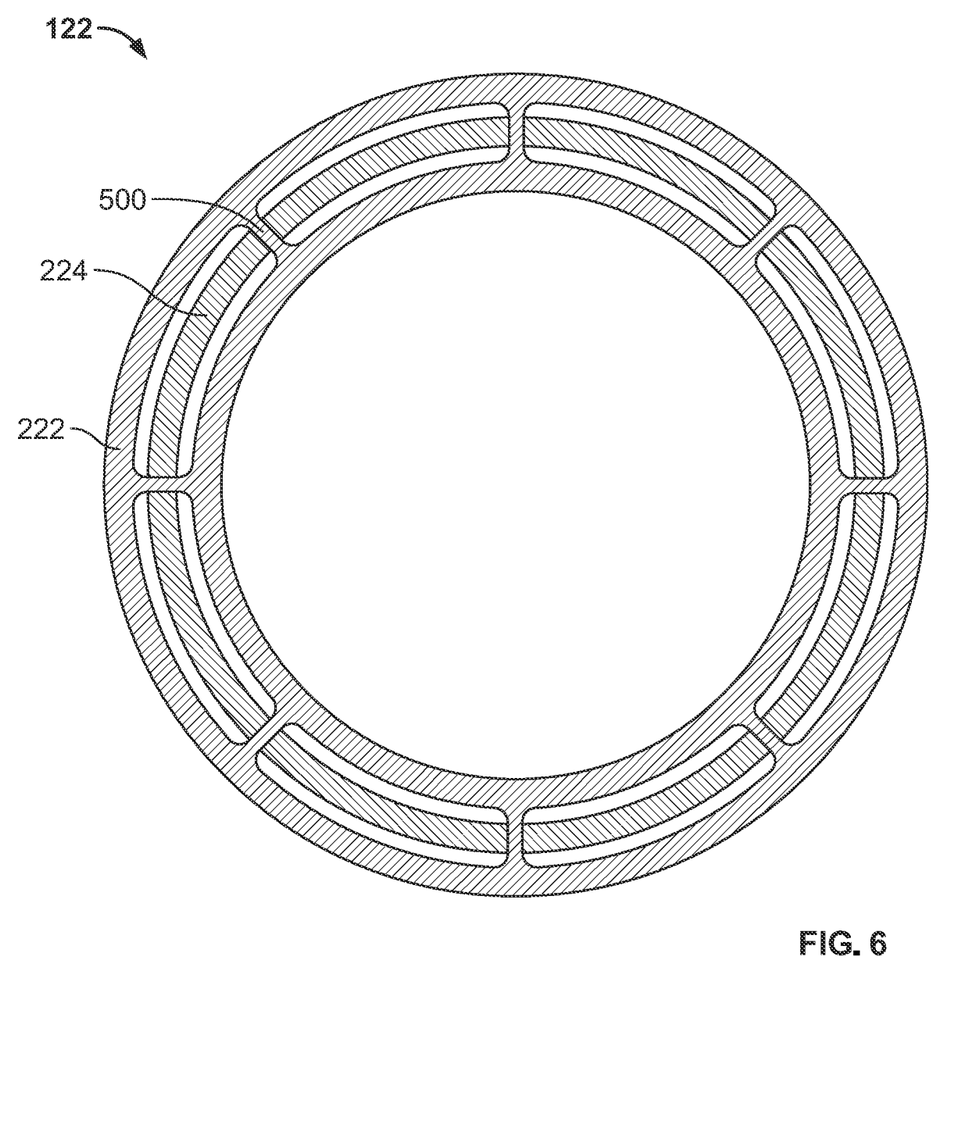
FIG. 6 is a cross-sectional view of the example cage of FIG. 5 taken along line A-A of FIG. 5.

FIG. 6 is a cross-sectional view taken along line A-A of FIG. 5 showing the insert 224 in the body 222. In the illustrated, the cage 122 includes eight (8) ribs 500 (one of which is referenced in FIG. 6). In some examples, the ribs 500 are spaced equidistant from each other. In other examples, the cage 122 can include more or fewer ribs, and/or the ribs 500 may be spaced differently. In some examples, the cage 122 includes only one rib. In other examples, the cage 122 can include other features to prevent or limit the insert 224 from rotating.

Figure 7:
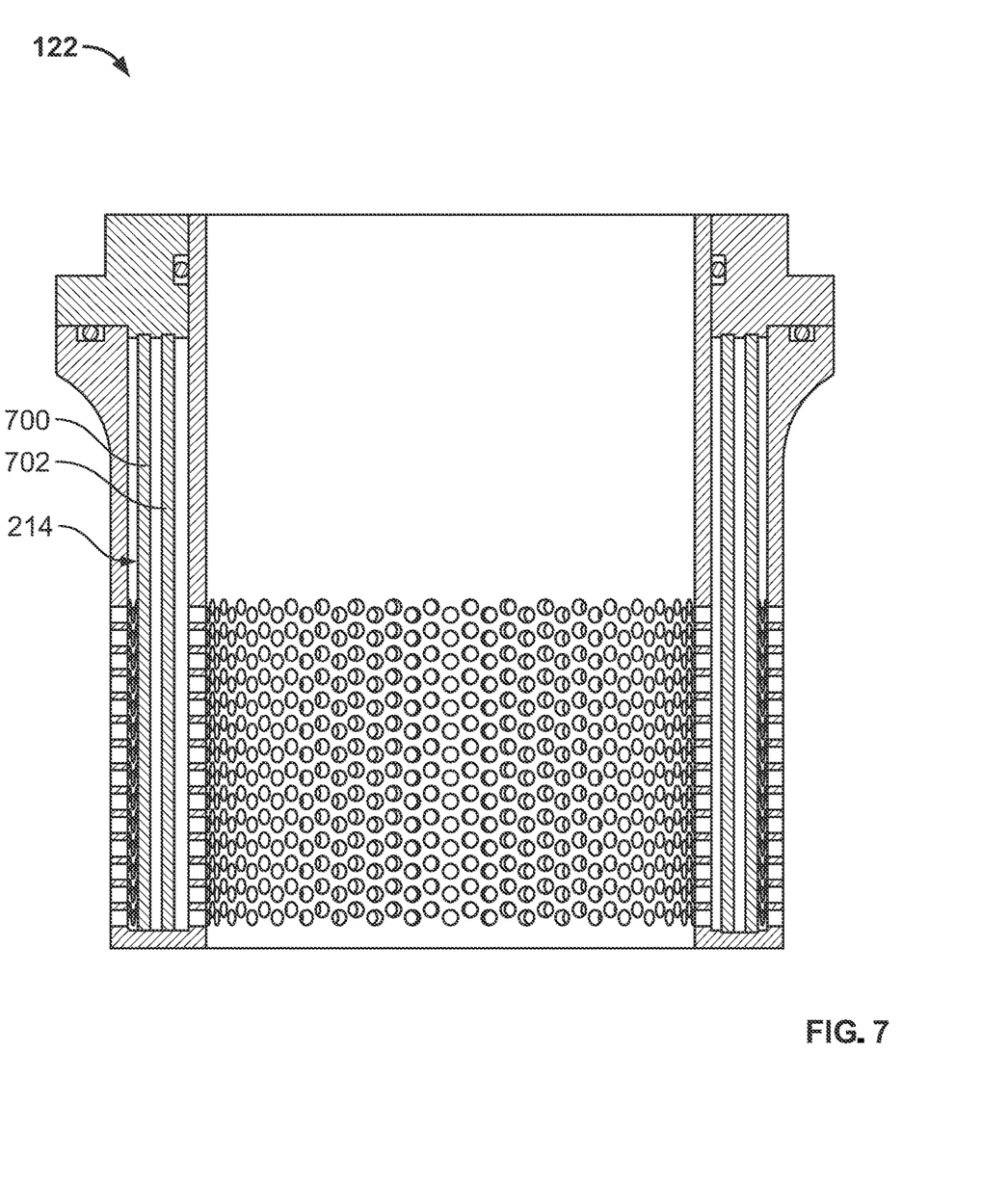
FIG. 7 is a cross-sectional view of the example cage of FIG. 2 showing an example with multiple inserts.

In some examples, multiple inserts can be used. For example, the cage 122 may include two or more inserts disposed in the cavity 214. The inserts have different diameters and are concentrically arranged in the cavity 214. For example, FIG. 7 shows an example in which the cage 122 includes a first insert 700 and a second insert 702 disposed in the cavity 214. The inserts 700, 702 may have the same type of lattice structure or different types of lattice structures. Using multiples inserts provides the ability to have multiple pressure staging devices in a single housing.

Figure 8:
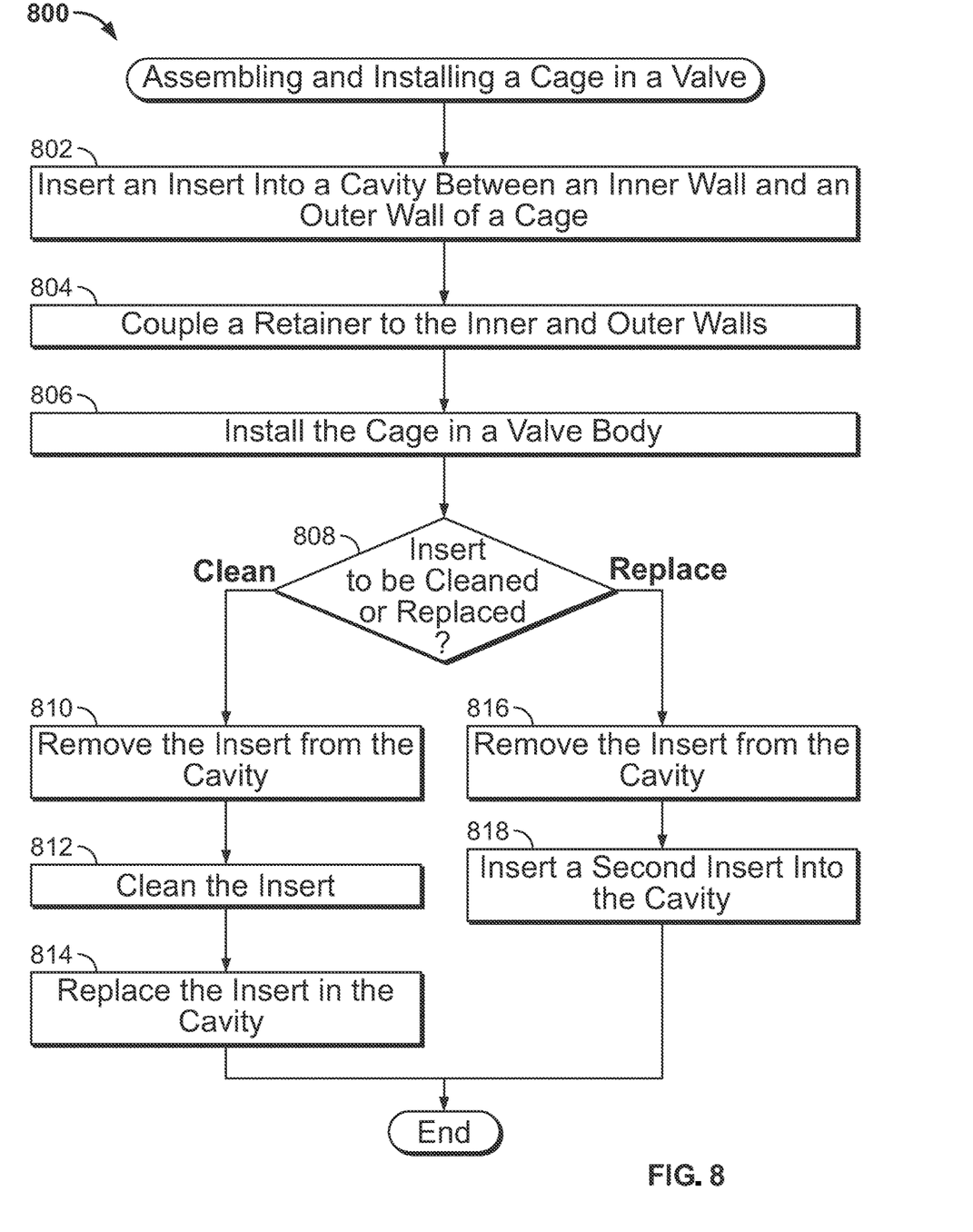
FIG. 8 is a flowchart representative of an example method of assembling and installing an example cage in an example valve.

FIG. 8 is a flowchart representative of an example method 800 of assembling and installing the cage 122 in the valve 100. The method 800 includes inserting the insert 224 into the cavity 214 defined between the inner wall 200 and the outer wall 208 of the cage 122 (block 802). For example, the retainer 232 can be removed from the body 222, and the insert 224 can be inserted into the cavity 214 of the body 222. In some examples, such as shown in FIGS. 5 and 6, the cage 122 may include one or more ribs 500. In such an instance, the insert 224 may be oriented to align the slots 502 with the ribs 500 before inserting the insert 224 into the cavity 214. In some examples, such as shown in FIG. 7, multiple inserts can be inserted into the cavity 214.

The example method 800 includes coupling the retainer 232 to the inner and outer walls 200, 208 (block 804). For example, the flange 234 can be friction fit between the inner and outer walls 200, 208. In some examples, the insert 224 is clamped between the retainer 232 and the end wall 220, thereby constraining the insert 224 in the body 222 of the cage 122.

The method 800 includes installing the cage 122 in the valve body 102 of the valve 100 (block 806). For example, with the second body portion 112 separated from the first body portion 110, the cage 122 can be inserted into the fluid passageway 104. Then, the second body portion 112 can be coupled (e.g., bolted) to the first body portion 110.

After a period of time, it may be desirable to clean or replace the insert 224 (block 808). In particular, over time, the third openings 230 of the insert 224 may become clogged with debris, which affects fluid flow through the valve 100. In some examples, the method 800 includes removing the insert 224 from the cavity 214 (block 810), cleaning the insert 224 (block 812), and replacing the insert 224 in the cavity 214 (block 814). In other examples, the method 800 can include removing the insert 224 (a first insert) from the cavity 214 (block 816) and inserting another insert (a second insert) into the cavity 214 (block 818). The second insert may be the type of insert or a different type of insert as the insert 224. In some examples, removing the insert 224 from the cavity 214 includes disconnecting the second body portion 112 from the first body portion 110 and removing the retainer 232. The insert 224 can then be removed from the body 222 of the cage 122 without removing the body 222 from the first body portion 110 of the valve body 102. In other examples, the entire cage 122 can be removed from the valve body 102, and then the insert 224 can be removed from the valve body 102.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that reduce time and costs associated with manufacturing, assembly, and cleaning cages for valves. Examples disclosed herein provide inserts that can be constructed to achieve desirable noise attenuation and cavitation reduction. The example inserts can be easily cleaned and/or replaced. As such, the entire cage does not need to be completely removed from the valve and cleaned. Further, because the insert provides the small openings to achieve the desired noise attenuation and cavitation reduction, the walls of the body of the cage can be constructed with larger holes, which reduces manufacturing time and costs. In some examples, the inserts are 3D printed, which enables the inserts to have intricate lattice structures for forming small fluid pathways. The example cages disclosed herein can be used with compressible or non-compressible fluids.

Examples and combinations of examples disclosed herein include the following:

Example 1 is a valve comprising a valve body defining a fluid passageway between an inlet and an outlet, a plug, and a cage in the fluid passageway. The plug is disposed in the cage. The plug is moveable in the cage to control fluid flow through the fluid passageway. The cage includes an inner wall having first openings and an outer wall having second openings. The outer wall is disposed coaxially around the inner wall. The valve also includes an insert having third openings. The insert is disposed between the inner wall and the outer wall.

Example 2 includes the valve of Example 1, wherein the insert has a lattice structure.

Example 3 includes the valve of Example 2, wherein the lattice structure is a triply periodic lattice structure.

Example 4 includes the valve of any of Examples 1-3, wherein the insert is constructed of multiple layers of a same material or different materials that are weld compatible.

Example 5 includes the valve of any of Examples 1-4, wherein the third openings are smaller than the first openings and the second openings.

Example 6 includes the valve of any of Examples 1-5, wherein the insert is spaced apart from the inner wall and the outer wall.

Example 7 includes the valve of Example 6, wherein the insert is spaced equidistant from the inner wall and the outer wall.

Example 8 includes the valve of any of Examples 1-7, wherein the cage includes a retainer coupled to the inner and outer walls. The retainer is engaged with an end of the insert to constrain the insert in a cavity formed between the inner and outer walls.

Example 9 includes the valve of any of Examples 1-8, wherein the cage includes ribs between the inner wall and the outer wall to prevent the insert from rotating.

Example 10 includes the valve of Example 9, wherein the insert includes slots, the ribs extending through the slots.

Example 11 is a cage to be disposed in a fluid passageway of a valve. The cage comprises an inner wall having first openings and an outer wall having second openings. The outer wall is disposed coaxially around the inner wall such that a cavity is formed between the inner wall and the outer wall. The cage also includes a removeable insert between the inner wall and the outer wall. The insert is coaxial with the inner wall and the outer wall. The insert has a lattice structure forming third openings through the insert.

Example 12 includes the cage of Example 11, wherein the lattice structure is a triply periodic lattice structure.

Example 13 includes the cage of Examples 11 or 12, further including an end wall coupled between an end of the inner wall and an end of the outer wall.

Example 14 includes the cage of Example 13, further including a retainer coupled to the inner wall and the outer wall. The insert is clamped between the retainer and the end wall.

Example 15 includes the cage of Example 14, wherein the retainer has a flange that is friction fit between the inner and outer walls.

Example 16 includes the cage of Example 15, wherein the flange has a recess. An end of the insert is disposed in the recess.

Example 17 is a method comprising inserting an insert into a cavity defined between an inner wall and an outer wall of a cage. The inner wall, the outer wall, and the insert are coaxial. The insert includes a lattice structure defining openings through the insert. The method also includes installing the cage in a valve body of a valve.

Example 18 includes the method of Example 17, further including coupling a retainer to the inner wall and the outer wall to constrain the insert in the cavity.

Example 19 includes the method of Examples 17 or 18, further including removing the insert from the cavity, cleaning the insert, and replacing the insert in the cavity.

Example 20 includes the method of any of Examples 17-19, wherein the insert is a first insert, further including removing the first insert from the cavity and installing a second insert in the cavity.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A valve comprising:
a valve body defining a fluid passageway between an inlet and an outlet;
a plug; and
a cage in the fluid passageway, the plug disposed in the cage, the plug moveable in the cage to control fluid flow through the fluid passageway, the cage including:
an inner wall having first passages extending between an inner surface and an outer surface of the inner wall, the first passages having a constant diameter;
an outer wall having second passages extending between an inner surface and an outer surface of the outer wall, the second passages having a constant diameter, the outer wall disposed coaxially around the inner wall; and
an insert disposed between the inner wall and the outer wall, the insert having a lattice structure in the shape of a cylinder, the lattice structure having interconnected cells forming third passages extending between an inner surface and an outer surface of the insert, the third passages having a maximum diameter that is less than a minimum diameter of the first passages and less than a minimum diameter of the second passages.

2. The valve of claim 1, wherein the lattice structure is a triply periodic lattice structure.

3. The valve of claim 1, wherein the insert is constructed of multiple layers of a same material or different materials that are weld compatible.

4. The valve of claim 1, wherein the insert is spaced apart from the inner wall and the outer wall.

5. The valve of claim 4, wherein the insert is spaced equidistant from the inner wall and the outer wall.

6. The valve of claim 1, wherein the cage includes a retainer coupled to the inner and outer walls, the retainer engaged with an end of the insert to constrain the insert in a cavity formed between the inner and outer walls.

7. The valve of claim 1, wherein the cage includes ribs between the inner wall and the outer wall to prevent the insert from rotating.

8. The valve of claim 7, wherein the insert includes slots, the ribs extending through the slots.

9. A cage to be disposed in a fluid passageway of a valve, the cage comprising:
an inner wall having first openings;
an outer wall having second openings, the outer wall disposed coaxially around the inner wall;
an end wall coupled between the inner wall and the outer wall such that the inner wall, the outer wall, and the end wall form a single component removable from or insertable into the valve, and such that a cavity is formed between the inner wall, the outer wall, and the end wall; and
a removeable insert disposed in the cavity between the inner wall and the outer wall, the insert coaxial with the inner wall and the outer wall, the insert having a lattice structure forming third openings through the insert.

10. The cage of claim 9, wherein the lattice structure is a triply periodic lattice structure.

11. The cage of claim 9, further including a retainer coupled to the inner wall and the outer wall, the insert clamped between the retainer and the end wall.

12. The cage of claim 11, wherein the retainer has a flange that is friction fit between the inner and outer walls.

13. The cage of claim 12, wherein the flange has a recess, an end of the insert disposed in the recess.

14. A method comprising:
inserting an insert into a cavity defined between an inner wall and an outer wall of a cage, the inner wall, the outer wall, and the insert being coaxial, the inner wall having first passages extending between an inner surface and an outer surface of the inner wall, the first passages having a constant diameter, the outer wall having second passages extending between an inner surface and an outer surface of the outer wall, the second passages having a constant diameter, the insert including a lattice structure in the shape of a cylinder, the lattice structure defining third passages extending between an inner surface and an outer surface of the insert, the third passages having a maximum diameter that is less than a minimum diameter of the first passages and less than a minimum diameter of the second passages; and
installing the cage in a valve body of a valve.

15. The method of claim 14, further including coupling a retainer to the inner wall and the outer wall to constrain the insert in the cavity.

16. The method of claim 14, further including:
removing the insert from the cavity;
cleaning the insert; and
replacing the insert in the cavity.

17. The method of claim 14, wherein the insert is a first insert, further including:
removing the first insert from the cavity; and
installing a second insert in the cavity.

18. A valve comprising:
a valve body defining a fluid passageway between an inlet and an outlet;
a plug; and
a cage in the fluid passageway, the plug disposed in the cage, the plug moveable in the cage to control fluid flow through the fluid passageway, the cage including:
an inner wall having first openings;
an outer wall having second openings, the outer wall disposed coaxially around the inner wall;
an insert disposed between the inner wall and the outer wall, the insert having a lattice structure in the shape of a cylinder, the lattice structure having interconnected cells forming third openings; and
a retainer coupled to the inner and outer walls, the retainer engaged with an end of the insert to constrain the insert in a cavity formed between the inner and outer walls, wherein the retainer has a flange extending into the cavity, the end of the insert engaged with the flange.

19. The valve of claim 18, wherein the flange has a recess, the end of the insert disposed in the recess.

* * * * *